United States Patent Office 3,301,901
Patented Jan. 31, 1967

3,301,901
PHOSPHINYLATED ACETAMIDE COMPOUNDS
Henry Tolkmith, Midland, Mich., assignor to The Dow Chemical Company, Midland, Mich., a corporation of Delaware
No Drawing. Filed Jan. 10, 1964, Ser. No. 336,884
4 Claims. (Cl. 260—562)

The present invention is directed to phosphinylated acetamide compounds and is particularly directed to 2,2,2-trihalo-N-(diarylphosphinothioyl)acetamide compounds having the formula

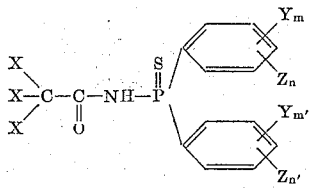

In the above and succeeding formulae, each X independently represents a member selected from the group consisting of bromo, chloro, and fluoro; each Y independently represents loweralkyl; each Z independently represents halogen; each of $m$ and $m'$ represents an integer of from 0 to 5, both inclusive; each of $n$ and $n'$ represents an integer of from 0 to 2, both inclusive; the sum of $m$ and $m'$ is not in excess of 6; the sum of $n$ and $n'$ is not in excess of 2; and the sum of $m$, $m'$, $n$, and $n'$ is not in excess of 6. In the present specification and claims, the term "halogen" is employed to refer to bromine, chlorine, and fluorine, and the term "loweralkyl" is employed to designate a radical selected from the group consisting of methyl, ethyl, m-propyl, and n-butyl.

The novel compounds are oils or crystalline solid materials at room temperature, of low solubility in water and low to moderate solubility in common organic solvents, such as acetone and benzene. The novel compounds are useful as parasiticides and herbicides and are adapted to be employed for the control of a number of plant, fungal, mite, helminth, insect, and nematode organisms. They are especially adapted to be employed for the control of aquatic plant organisms.

The compounds of the present invention are prepared by reacting together a P,P-diarylphosphinothioic amide having the formula

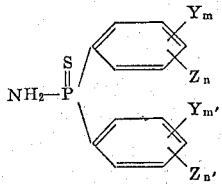

with a trihaloacetyl chloride of the formula

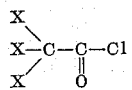

The reaction takes place at temperatures at which hydrogen chloride is evolved, conveniently at temperatures of from −10° to 60° C., and preferably at temperatures of from 20° to 50° C., with the production of the desired product and chloride of reaction. A hydrogen halide acceptor such as, for example, triethylamine, pyridine, or the like, can be added to the reaction mixture. The chloride of reaction appears in the reaction mixture as hydrogen chloride gas or, if an acceptor is used, as the hydrogen chloride salt of the acceptor.

The amounts of the reactants to be employed are not critical, some of the desired product compound being obtained when employing the reactants in any amounts. However, the reaction consumes the reactants and hydrogen halide acceptor in equimolecular proportions, and it is preferred to employ the reactants and hydrogen halide acceptor in amounts which represent such proportions. Advantageously, the reaction is carried out in an inert liquid reaction medium, such as, for example, benzene, alkylbenzenes, alkanes, and alkyl halides.

In carrying out the reaction, the reactants are contacted together in any convenient fashion and maintained for a period of time in the reaction temperature range to complete the reaction. Following the completion of the reaction, the reaction mixture can be employed for the useful purposes of the present invention, or the product compound can be separated from the reaction mixture. In such procedures, the reaction mixture can be filtered to remove therefrom the chloride of reaction, and the reaction medium removed from the filtrate by distillation or evaporation under reduced pressure to obtain the desired product as a residue. This product residue can be employed without purification or can be purified by conventional procedures, such as, for example, washing with water or recrystallization.

Those compounds of the present invention wherein the aryl groups are identical, i.e., compounds of the formula

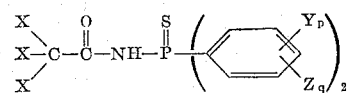

constitute a preferred embodiment of the present invention. In the above formula, $p$ represents an integer of from 0 to 5, inclusive; $q$ represents an integer of from 0 to 2, inclusive; and the sum of $p$ and $q$ is not in excess of 5.

The following examples illustrate the invention but are not to be construed as limiting.

*Example 1.—N-(diphenylphosphinothioyl)-2,2,2-trichloroacetamide*

In 300 milliliters of benzene were mixed triethylamine (22.0 grams; 0.21 mole) and P,P-diphenylphosphinothioic amide (47.0 grams; 0.2 mole) to prepare a first mixture. A second mixture of 36.5 grams of trichloroacetyl chloride (0.2 mole) and 300 milliliters of benzene was added to the first mixture. The addition was carried out portionwise over a period of time and at room temperature of about 25° C. Thereafter, the resulting reaction mixture was filtered to remove chloride of reaction and the filtrate washed with water. The liquid reaction medium was removed from the washed filtrate by evaporation under subatmospheric pressure to obtain the N-(diphenylphosphinothioyl)-2,2,2-trichloroacetamide product as a residue.

The product residue was dispersed in cyclohexane, the resulting dispersion filtered and the cyclohexane removed from the filtrate by evaporation to obtain purified product residue. The purified product residue was further purified by recrystallization from methanol. The product melts at 170° C.

In a similar manner, other representative compounds of the present invention are prepared as follows:

From P,P-diphenylphosphinothioic amide and dichlorofluoroacetyl chloride, N - (diphenylphosphinothioyl)-2,2-dichloro-2-fluoroacetamide product having a molecular weight of 362.2.

From P,P-diphenylphosphinothioic amide and trifluoroacetyl chloride, N - (diphenylphosphinothioyl)-2,2,2-trifluoroacetamide product having a molecular weight of 329.3.

From P - phenyl-P-(2,4-diclorophenyl)phosphinothioic amide and tribromoacetyl chloride, N-(phenyl(2,4-dichlorophenyl)phosphinothioyl) - 2,2,2 - tribromoacetamide product having a molecular weight of 581.9.

From P - phenyl-P-(pentamethylphenyl)phosphinothioic amide and trifluoroacetyl chloride, N-(phenyl(pentamethylphenyl)phosphinothioyl) - 2,2,2 - trifluoroacetamide product having a molecular weight of 399.4.

From P - (para-bromophenyl)-P-(2,4,6-triethylphenyl)phosphinothioic amide and trichloroacetyl chloride, N-((para - bromophenyl)(2,4,6 - triethylphenyl)phosphinothioyl) - 2,2,2 - trichloroacetamide product having a molecular weight of 541.7.

From P - (2 - chloro - 4 - butylphenyl)-P-(para-fluorophenyl)phosphinothioic amide and dibromochloroacetyl chloride, N - ((2 - chloro - 4 - butylphenyl)(para - fluorophenyl)phosphinothioyl) - 2,2, - dibromo - 2 - chloroacetamide product having a molecular weight of 576.1.

From P - 2,4 - difluorophenyl) - P - (ortho - tolyl)phosphinothioic amide and dichlorofluoroacetyl chloride, N - ((2,4 - difluorophenyl)(ortho - tolyl)phosinothioyl) - 2,2 - dichloro - 2 - fluoroacetamide product having a molecular weight of 412.2.

When a compound of the present invention is employed as a parasiticide and/or herbicide, the compound can be dispersed on a finely divided solid such as a chalk or talc or a finely divided solid surface active dispersing agent the resulting product employed as a dust. Such mixtures can also be dispersed in water and employed as a spray. In other procedures, the compound is employed as active constituent in solvent solutions, water-in-oil or oil-in-water emulsions, or aqueous dispersions.

In representative operations, a group of aquatic organisms consisting of Elodea, Cabomba, and Salvinia was placed for a period of several hours in an aqueous solution of N-(diphenylphosphinothioyl)-2,2,2-trichloroacetamide, as sole active agent and in an amount representing 10 parts of compound per million parts by weight of ultimate composition. Thereafter, the aquatic organisms were removed from the aqueous dispersion of the product compound, washed in fresh water, and returned to normal growing conditions for a period of about three weeks. It was found that 100 percent kill and control of Elodea, Cabomba, and Salvinia, had been obtained.

The P,P-diarylphosphinothioic amide employed as a starting material in the preparation of the compounds of the present invention is prepared by reacting together an aromatic compound, aluminum chloride, and phosphorus trichloride ($PCl_3$), at temperatures of from 50° to 280°, to prepare a diarylphosphorus chloride product of the formula Cl—P—Ar$_2$ and HCl by-product. When the aryl groups are identical, the aromatic compound employed is of the formula

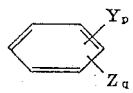

When the aryl groups are not identical, a mixture of aromatic compounds is employed. Such mixture consists essentially of one aromatic compound of (Formula A) 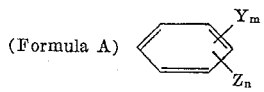

and one aromatic compound of (Formula B) 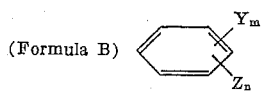

Good results are obtained when employing the reactants in amounts which represent 1.3 molecular proportions of aluminum chloride, 4 molecular proportions of phosphorus trichloride, and 1 molecular proportion of aromatic compound or a mixture of about one-half molecular proportion of the compound of Formula A and about one-half molecular proportion of the compound of Formula B. The $PCl_3$ is separated in conventional procedures and the diarylphosphorus chloride reacted with an excess of $PSCl_3$ at temperatures of from 50 to 150° C. to prepare a diarylphosphorochloridothioate product of the formula

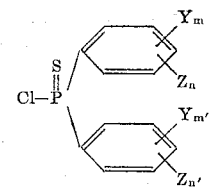

The diarylphosphorochloridothioate product is thereafter reacted with ammonia, in known procedures, to prepare the desired P,P-diarylphosphinothioic amide starting material. The reaction goes forward at temperatures at which chloride of reaction is evolved, and is conveniently conducted in the presence of an organic liquid and of an acid binding agent. The chloride of reaction appears in the reaction mixture as the chloride salt of the acid binding agent. Good results are obtained when employing equimolecular proportions of diarylphosphorocloridothioate product, ammonia, and acid binding agent. Excess ammonia can be employed as acid binding agent. After the completion of the reaction, the P,P-diarylphosphinothioic amide is separated from the reaction mixture and, if desired, purified, by conventional procedures.

I claim:
1. Compound of the formula

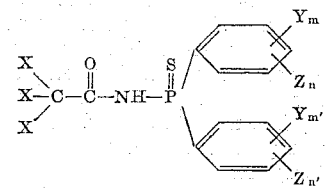

wherein each X represents a member selected from the group consisting of bromo, chloro, and fluoro; each Y independently represents loweralkyl; each Z independently represents halogen; each of $m$ and $m'$ represents an integer of from 0 to 5, both inclusive; each of $n$ and $n'$ represents an integer of from 0 to 2, both inclusive; the sum of $m$ and $m'$ is not in excess of 6; the sum of $n$ and $n'$ is not in excess of 2; and the sum of $m$, $m'$ $n$, and $n'$ is not in excess of 6.

2. N - (diphenylphospinothioyl) - 2,2,2 - trichloroacetamide.

3. N - (diphenylphosphinothioyl) - 2,2 - dichloro-2-fluoroacetamide.

4. N - (diphenylphosphinothioyl) - 2,2,2 - trifluoroacetamide.

No references cited.

WALTER A. MODANCE, *Primary Examiner.*

N. TROUSOF, *Assistant Examiner.*